(No Model.)
E. W. RICE, Jr.
ALTERNATING CURRENT GENERATOR.
No. 523,779. Patented July 31, 1894.
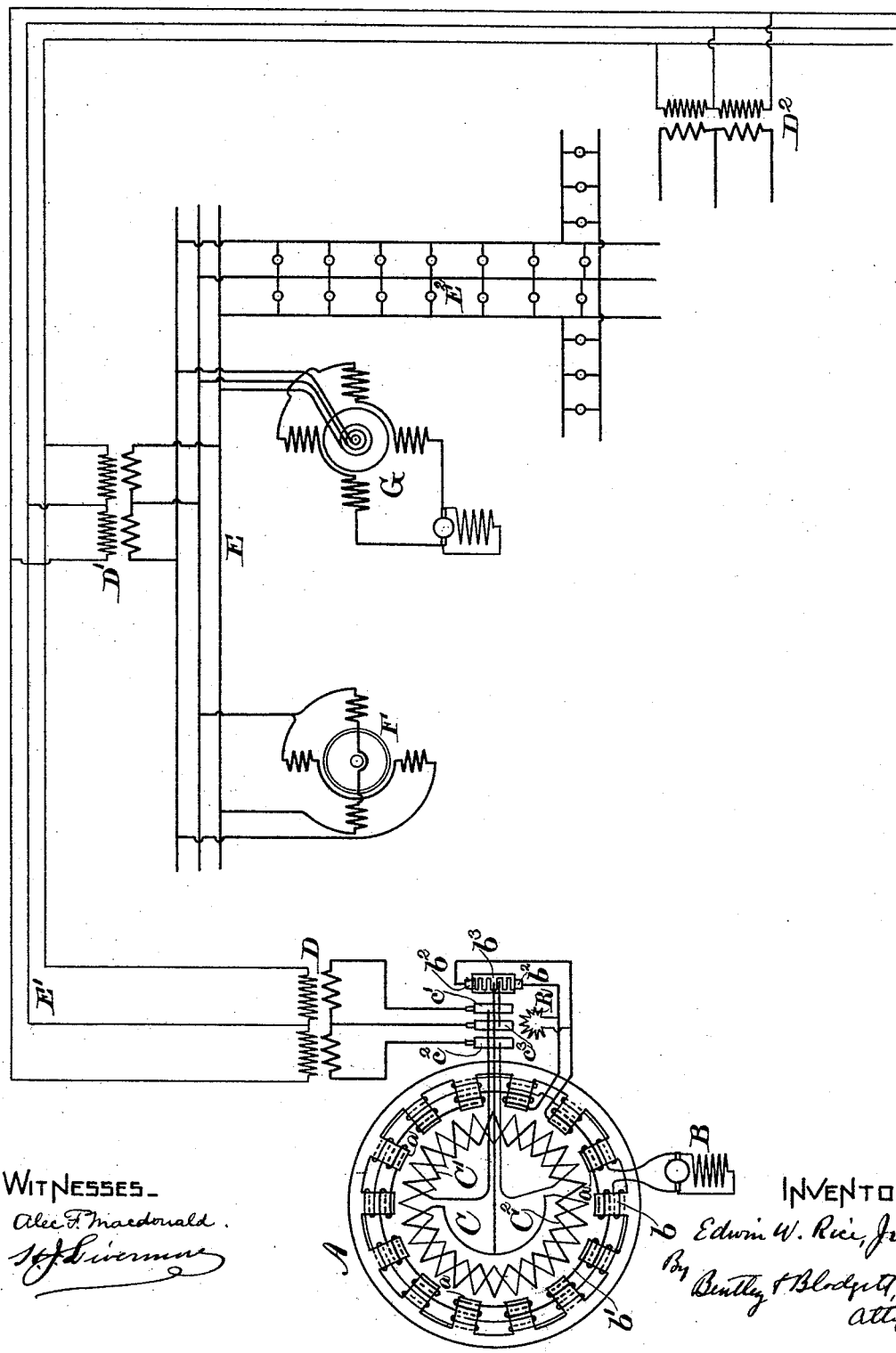
WITNESSES—
Alec F. Macdonald
S. J. Livermore
INVENTOR—
Edwin W. Rice, Jr.
By Bentley & Blodgett
attys.

UNITED STATES PATENT OFFICE.

EDWIN W. RICE, JR., OF SWAMPSCOTT, ASSIGNOR TO THE GENERAL ELECTRIC COMPANY, OF BOSTON, MASSACHUSETTS.

ALTERNATING-CURRENT GENERATOR.

SPECIFICATION forming part of Letters Patent No. 523,779, dated July 31, 1894.

Application filed July 25, 1893. Serial No. 481,407. (No model.)

*To all whom it may concern:*

Be it known that I, EDWIN W. RICE, Jr., a citizen of the United States, residing at Swampscott, in the county of Essex and State of Massachusetts, have invented a certain new and useful Improvement in Alternating-Current Generators, of which the following is a specification.

My invention relates to dynamo-electric machines, and embodies a certain new and useful improvement in means for compounding two-phase alternating current generators for the maintenance of constant or approximately constant potential at the translating devices under variations of load.

In carrying out my invention, I provide two armature windings each connected to an independent line-wire, the return circuit being completed through a third line wire common to both windings. In the circuit of said common return I place a current rectifier whereby each phase of current, as it returns is rectified and led through a set of coils on the field magnets. The said field magnets consist in the usual pole-pieces wound so as to be of alternately north and south polarity around the armature, and are provided with the ordinary winding connected to any suitable source, such as a separately driven exciter machine, for the normal production of a magnetic field. The current in the latter winding is maintained approximately constant, while the commuted current of course varies with the load, thereby varying the strength of the magnetic field and the output of the machine after the usual manner of compounding electric generators.

The accompanying drawing is a diagram of the circuits employed in carrying out my invention.

Referring to the said drawing, the pole-pieces $a$ of the generator A are provided with a winding $b$ leading from the exciter B, adapted to generate a constant current. A supplementary winding $b'$ leads from the brushes, $b^2$, which rest upon the current rectifier $b^3$. The armature C, which is of the ring type, has two sets of coils C' and C$^2$ wound in opposite directions, and connected respectively to the rings $c'$ and $c^2$ from which the current is led by means of suitable collectors to the transformer D. A ring, $c^3$, also connected through a suitable brush or collecting device to the tranformer D serves as a common return for the alternate phases of current collected in turn from the rings $c'$ and $c^2$ and is connected to one portion of the current rectifier, $b^3$, the other portion of the said rectifier being connected to the coils of the armature. A feeder circuit E' is shown leading from the transformer D to transformers D' and D$^2$, and a work circuit E provided with various translating devices is fed from transformer D'. For example in the circuit from said transformer, are shown a set of incandescent lamps, C$^2$, a two-phase inductive motor F, and a synchronous alternating current motor G with separately excited fields, but it is obvious that any translating device capable of translating two-phase alternating currents may be employed.

The operation of the device is as follows: As the coils of the armature become active, phases of current flow alternately from the rings $c'$ and $c^2$, returning to ring $c^3$, thence to rectifier $b^3$, and back to the armature coils. From the said rectifier a direct current, varying in quantity according to the number of translating devices in the work circuit, is fed to the coils $b'$, thereby regulating the strength of the magnetic field and consequent output of the machine. A resistance R in shunt to the circuit containing said coils $b$, prevents sparking at the rectifier under sudden changes of load.

Having thus described my invention, what I claim as new, and wish to protect by Letters Patent of the United States, is—

1. In a generator for two-phase electric currents, the combination with a separately excited field coil, of an auxiliary field coil connected to the brushes of a current rectifier in circuit with both phases or impulses of current, whereby the field is variably excited in accordance with the work, as set forth.

2. In a generator for two-phase electric currents, a separately-excited field-magnet coil, two collecting devices adapted to receive alternate impulses of current from the coils of the armature, a third collecting device forming a common return for such impulses of current, a rectifier in circuit therewith, and auxiliary field-magnet coils supplied with current from the rectifier, substantially as described.

In witness whereof I have hereunto set my hand this 24th day of July, 1893.

EDWIN W. RICE, Jr.

Witnesses:
 JOHN W. GIBBONEY,
 BENJAMIN B. HULL.